United States Patent [19]

Brundage et al.

[11] 3,912,018
[45] Oct. 14, 1975

[54] HYDRAULIC TRANSPORT, LEVELING, AND HITCHING MECHANISM

[75] Inventors: John F. Brundage, Camarillo; James J. McKay, Oxnard, both of Calif.

[73] Assignee: Allis-Chalmers Corporation, Milwaukee, Wis.

[22] Filed: Aug. 22, 1974

[21] Appl. No.: 499,762

Related U.S. Application Data

[63] Continuation of Ser. No. 353,208, April 20, 1973, abandoned.

[52] U.S. Cl. .......... 172/328; 172/274; 172/396; 172/580; 172/680; 280/414.5; 280/477; 280/490 R
[51] Int. Cl.² A01B 63/22; A01B 59/00; A01B 51/00; B60D 7/00
[58] Field of Search ........... 172/272, 315, 316, 318, 172/324, 326, 327, 328, 396, 414, 413, 416, 467, 580, 668, 677–680, 274; 280/43.23, 414.5, 477, 463, 490 R

[56] References Cited
UNITED STATES PATENTS

| | | | |
|---|---|---|---|
| 2,686,648 | 8/1954 | Oehler | 172/272 |
| 2,869,305 | 1/1959 | Murray | 172/328 |
| 2,955,369 | 10/1960 | Shumaker et al. | 172/413 X |
| 3,271,042 | 9/1966 | Flodin | 280/43.23 |

Primary Examiner—Edgar S. Burr
Assistant Examiner—Steven A. Bratlie
Attorney, Agent, or Firm—Charles L. Schwab

[57] ABSTRACT

A disc harrow provided with a leveling hydraulic cylinder and a lifting cylinder for leveling and adjusting the height of such harrow, the leveling cylinder and lifting cylinder being connected in parallel to the hydraulic pressure source of a towing tractor. The leveling cylinder being connected between the disc harrow pole which is pivotally connected to such harrow and the outer ends of leveling arms pivotally mounted on the same pivot pin as such pole. Transport straps pivotally connectable between such pole and harrow for providing rigidity therebetween for transport and such straps being provided with a slot for receiving a pin carried by such pole for providing a limited degree of pivotal movement between the pole and harrow when the pivotal connection between such pole and transport strap is removed.

5 Claims, 2 Drawing Figures

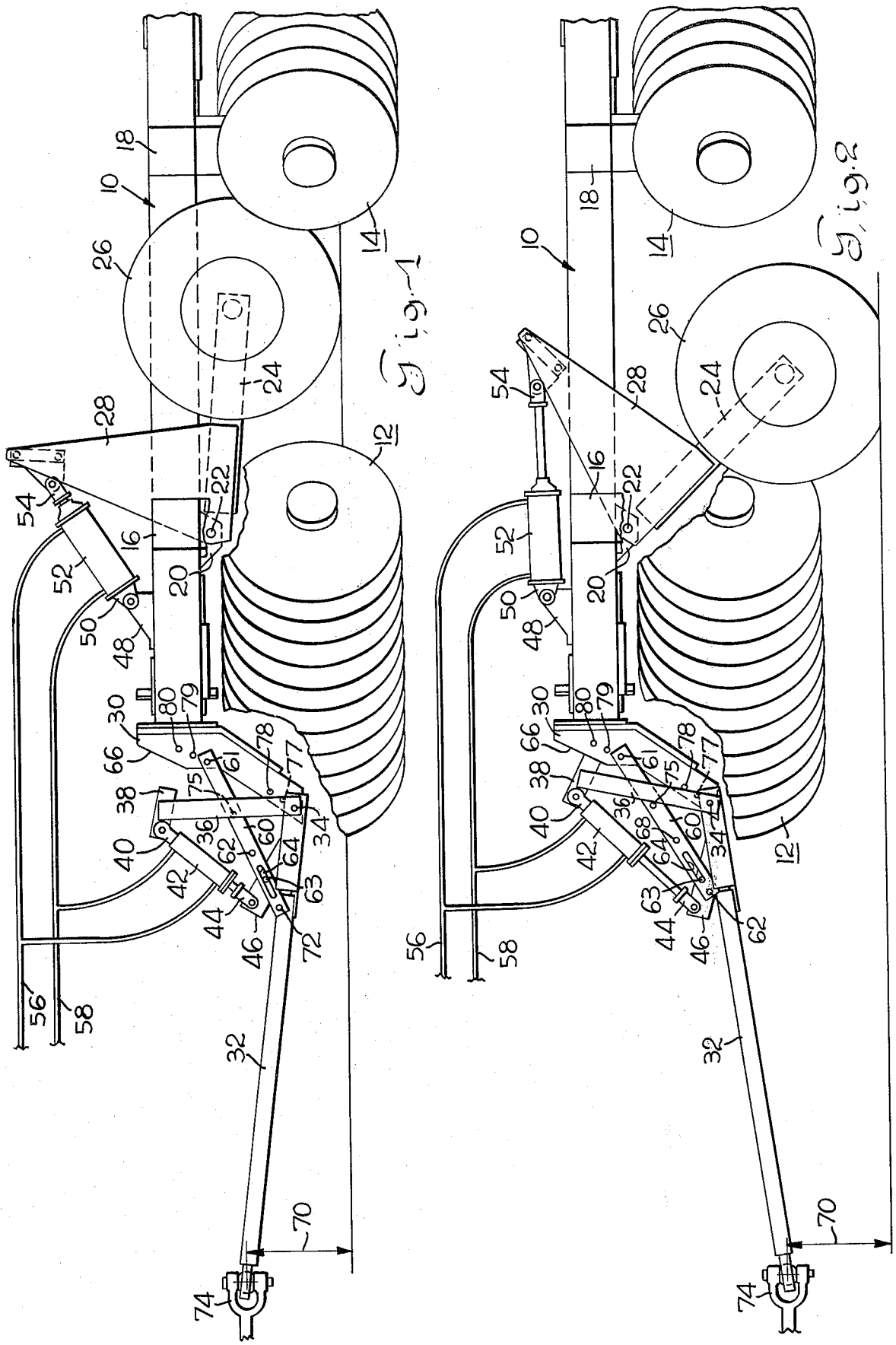

HYDRAULIC TRANSPORT, LEVELING, AND HITCHING MECHANISM

This is a continuation of application Ser. No. 353,208 filed Apr. 20, 1973, now abandoned.

This invention relates to improvements in a mechanism for leveling the rigid frame of an offset disc harrow.

In disc harrows of this type the wheels serve a double purpose. When the wheels are lowered by a hydraulic ram, the disc gangs are lifted above the ground level and the implement may be easily transported into or out of the field, or along a highway. When the hydraulic ram is retracted, the wheels are elevated so that the gangs are lowered to an operating position.

When in operating position the hitch pole structure must pivot vertically to provide a nonrigid connection between the tractor and implement in order to allow the tractor relative vertical movement over rough ground, ridges or furrows.

It is a principal object of this invention to provide an automatic control for lowering the hitch pole structure about its pivot connection with the frame as the frame rises for transport; and which will return the hitch pole structure to its initial position when the main frame structure of the disc is subsequently lowered to operating position.

Another object of this invention is to provide hydraulic control means operatively connecting the ground wheels with the hitch pole structure so that the tongue is raised or lowered respectively upon lifting or lowering of the wheels.

An object of this invention is to provide a hydraulically operated mechanism for controlling the hitch pole structure of a wheel type disc harrow as the latter is moved between working and transport positions.

A further object of this invention is to provide a hydraulically actuated mechanism which performs desired functions on any wheel carried disc harrow of (a) rotating the hitch pole structure so that the main frame of the disc remains level as the disc harrow is raised to transport position; (b) holds the disc harrow in this position for making field turns; (c) in operating position provides complete flexibility of the hitch pole structure with respect to the disc harrow for discing uneven or rough ground contours, and (d) permits vertical hitch height adjustment for optimum discing operations.

A still further object of this invention is to provide means for using the pulling tractor's hydraulic control unit to position the pole structure for easy hitching to the tractor clevis.

The foregoing and numerous other objects and advantages of the invention will become obvious from the following detailed description of a preferred embodiment, particularly when considered in connection with the accompanying drawings, in which:

FIG. 1 is a side elevational view of a tractor drawn offset disc harrow in operating position; and FIG. 2 is a side elevation view of the offset disc harrow shown in FIG. 1 but in transport position.

Referring now to FIG. 1, it is seen that the offset disc harrow includes a rigid frame structure designated 10 which is disposed normally in a horizontal plane.

A pair of gangs 12 and 14 are attached to and carried by the main frame structure 10 through the medium of subframes 16 and 18, respectively, which are interconnected between gangs 12 and 14 and main frame structure 10.

Mounted below the main frame structure 10 at each side of the harrow is a pillow block bearing 20. Rotatively mounted in the bearings 20 are a pair of rock shafts 22. At the outer end of each rock shaft 22, a leg 24 is attached. A pair of ground wheels 26 are rotatively mounted and carried by the free end of each leg 24.

Upon rotation of leg 24, the ground wheel 26 can be lifted to the fully retracted position shown in FIG. 1 or lowered to the fully extended position shown in FIG. 2. Cooperating with the mechanism for actuating the ground wheels 26, are a pair of arms 28 that are fixed to and extend above legs 24.

A head block 30 is secured to the forward end of frame structure 10 and has a hitch pole structure 32 pivotally connected to the lower end thereof for pivotal movement about pivot bolt 34 pivotally received in head block 30. Also mounted for pivotal movement about pivot pin 34 are a pair of transversely spaced leveling arms 36 which are interconnected at their upper ends by a cross member 38. The forward end of member 38 is pivotally connected to the cylinder anchor end 40 of ram 42. The piston rod end 44 of ram 42 is pivotally connected to bracket 46 on the hitch pole structure 32. The rear portion of pole structure 32 is adjustably attached to the head block 30.

Frame structure 10 is provided with a pair of brackets 48 to which the cylinder anchor ends 50 of rams 52 are pivotally connected. The piston rod ends 54 of rams 52 are pivotally connected to the distal ends of arms 28. Rams 42 and 52 are double acting rams which are mounted in parallel and are connected to the towing tractor's hydraulic system by means of hydraulic lines 56 and 58.

A pair of transversely spaced transport straps 60 are pivotally connected at their upper ends to head block 30 by bolt 61 and at their lower end to bracket 46 by means of transport pin 62 as shown in FIG. 2. A bolt 63 is slidably received within a slot 64 in straps 60 so that when transport pin 62 is removed a limited relative pivotal movement of the pole structure 32 to head block 30 is permitted as determined by the length of slot 64.

Operation

In FIG. 1, which shows the discing or working position, the leveling cylinder 42 and the transport cylinder 52 are connected in parallel to the tractor hydraulic power unit (not shown). As the transport wheels 26 are raised resulting in lowering the discs to working position — both the leveling cylinder 42 and the lift cylinders 52 are collapsed and the leveling arm member 38 is rotated from the abutment surface 66 of head block 30. The pole structure 32 is free to pivot about the transverse axis of pin 34 of the head block 30 within the range of slot 64. This provides the desired flexibility between the pulling tractor (not shown) and the disc harrow for uneven ground conditions. The transport pin 62 for the lower end of transport straps 60 is stored in an appropriately sized opening 68 (see FIG. 2) in the midportion of straps 60.

The transport position for field turns at headlands is obtained as follows:

The disc harrow is raised from working position (FIG. 1) to transport position (FIG. 2) by extending cyoinders 42 and 52. The leveling cylinder 42 in extending rotates leveling arms 36 clockwise resulting in member 38 contacting surface 66 of head block 30. Further extension of the leveling cylinder rotates the pole structure 32 downward around pin 34 maintaining the disc harrow frame structure in a horizontal or level position fore and aft while the outer end of pole structure 32 remains at approximately the same vertical height 70. In this position the disc harrow is prevented from tipping over backwards by the bolt 63 contacting transport straps 60 at the forward end of slot 64. Hydraulic fluid trapped in leveling cylinder 42 in extended position prevents the disc harrow from tipping forward. The transport pin 62 remains in storage hole 68 in transport straps 60 when raising disc for field turns.

The locked transport position is obtained as follows. With the disc harrow in the position described in the previous paragraph for transporting, transport pin 62 is removed from an opening or storage hole 68 and placed in another opening or hole 72 of transport straps 60 (FIG. 1) and through a hole (not shown) in bracket 46. Thus the transport straps 60 locked at transport pin 62 and pin 61 as shown in FIG. 2 prevent any rotation of the pole structure 32 about pivot 34.

The pole structure 32 can be hydraulically raised for hitching to a tractor. This is accomplished with the parts positioned in locked transport position as described in the previous paragraph (FIG. 2). First connect to the tractor hydraulics and fully extend the leveling and lifting cylinders 42 and 52, respectively. The transport lock pin 62 may then be removed from hole 72 (FIG. 1) and installed at hole 75 in transport straps 60 (FIG. 2). Reverse the flow of oil from the tractor to retract the leveling and lift cylinders and lower the disc harrow towards working position. By controlling the flow of oil to the leveling cylinder 42 the pole structure 32 may be raised to the proper height for hitching to the tractor clevis 74. After the pole structure is connected to the tractor adjust oil flow to raise the discs by extending the cylinders. As soon as pin 62 can be removed from hole 75, remove same and place in hole 68. The tractor hydraulics are then used to collapse the lift and leveling cylinders 52, 42 and thus placing the disc in working position.

A hitch height adjustment is provided between the rear end of the pole structure 32 and the head block 30 of the main frame structure 10. The pole structure 32 in both figures of the drawing is connected for pivotal movement about bolt 34 and the upper ends of the transport straps 60 are connected for pivotal movement about pivot bolt 61. FIGS. 1 and 2 show the lowest hitch height adjustment. Two higher hitch points are provided. As the pivot bolt 34 for the pole structure 32 is moved upwardly to holes 77 or 78, bolt 61 of strap 60 is moved upwardly by removing pin 61 and inserting same in holes 79 or 80 in head block 30. Thus the leveling mechanism linkage remains substantially the same for all three hitch height adjustments. Additional depth control (besides hitch height adjustment) can be obtained by use of stroke control stops on the lift cylinders 52. Thus the ground wheels 26 act as gauge wheels. Again, this control has no effect on the leveling mechanism.

The embodiments of the invention in which an exclusive property or privilege is claimed are defined as follows:

1. In a disc harrow, a frame structure, disc gangs attached to said frame structure, a hitch pole structure having one end pivotally connected to the forward end of said frame structure for pivotal movement about a first transverse axis and having a hitch component at its other end, ground wheels mounted on legs pivoted to said frame, a transport strap, a pair of connecting means connecting said strap at its opposite ends to said structures, respectively, one of said connecting means being a pivot connection on a second transverse axis and the other of said connecting means a lost motion connection spaced from said first and second axes permitting a limited degree of pivotal movement between said structures about said first transverse axis, a leveling arm pivoted at one end about said first transverse axis and having its other end in abutable relation to one of said structures, a first hydraulic ram connected at one end to the other of said structures and at its other end to said leveling arm at a point spaced from said first transverse axis, said upper end of said leveling arm abutting said one structure on extension of said first ram, a second hydraulic ram connected between one of said legs and said frame structure and being operative to move said wheels into ground engaging position and to retract said wheels to permit discing, both of said rams being double acting rams and being connected in parallel so that when said rams are extended said disc gangs are raised to transport position while the hitch pole structure is swung downwardly about said first transverse axis to maintain the frame structure substantially level.

2. In a disc harrow as recited in claim 1 and wherein the forward end of said frame structure is provided with a head block having a plurality of vertically spaced holes, and further comprising a first pivot pin pivotally connecting said pole structure to said head block for swinging movement about said first transverse axis, said first pivot pin being in cooperative engagement with a selected one of said holes, a plurality of vertically spaced openings in said head block and a pin in a second selected one of said openings comprising said second transverse axis and pivotally connecting said head block with said strap.

3. In a disc harrow as recited in claim 1 wherein said other connecting means effects a lost motion connection between one end of said strap and said other structure and wherein said one end of said strap is provided with a first opening for receiving a locking pin which is also received in said other structure for preventing relative pivotal movement between said structures.

4. In a disc harrow as recited in claim 3 and wherein said transport strap is provided with a second opening for storing said locking pin when the latter is not in said first opening.

5. In a disc harrow as recited in claim 1 wherein said leveling arm extends upwardly from said first transverse axis and wherein said strap extends longitudinally between said structures above said first transverse axis passing adjacent a central portion of said leveling arm and wherein said transport strap is provided with an opening in a midportion thereof for receiving a locking pin, said pin being in longitudinal thrust transmitting engagement with said central portion of said leveling arm when the latter is in abutment with said one structure and said locking pin is installed in said opening whereby said leveling arm is restrained from movement away from said one structure and upon contraction of said first hydraulic ram said pole structure is pivoted upwardly about said first transverse axis relative to said frame structure.

* * * * *